US005641468A

United States Patent [19]
Ellgen

[11] Patent Number: 5,641,468
[45] Date of Patent: Jun. 24, 1997

[54] LITHIUM MANGANESE OXIDE COMPOUND AND METHOD OF PREPARATION

[75] Inventor: Paul C. Ellgen, Oklahoma City, Okla.

[73] Assignee: Kerr-McGee Chemical Corporation, Oklahoma City, Okla.

[21] Appl. No.: 524,859

[22] Filed: Sep. 7, 1995

[51] Int. Cl.[6] ........................................... C01G 45/12
[52] U.S. Cl. ................................... 423/599; 429/224
[58] Field of Search ............................ 423/599; 429/224

[56] References Cited

U.S. PATENT DOCUMENTS 5,266,299  11/1993  Tarascon ................................. 423/599
5,370,710  12/1994  Nagaura et al. ....................... 423/599
5,449,577  9/1995   Dahn et al. ............................ 423/599

*Primary Examiner*—Wayne Langel
*Attorney, Agent, or Firm*—Herbert M. Hanegan; J. Rodgers Lunsford, III

[57] ABSTRACT

A method for manufacturing $Li_2Mn_2O_4$ comprising the steps of providing $LiMn_2O_4$; providing a source of lithium; dissolving lithium from the lithium source in a liquid medium in which lithium generates solvated electrons or the reduced form of an electron-transfer catalyst; and contacting the $LiMn_2O_4$ with the liquid medium containing the dissolved lithium and the solvated electrons or the reduced form of the electron-transfer catalyst.

29 Claims, No Drawings

LITHIUM MANGANESE OXIDE COMPOUND AND METHOD OF PREPARATION

FIELD OF THE INVENTION

The present invention relates to a lithium manganese oxide compound and its production by contacting $LiMn_2O_4$ with lithium dissolved in a solvent in which lithium generates solvated electrons or in which a catalyst is present that is capable of accepting an electron from lithium and delivering it to the $LiMn_2O_4$.

BACKGROUND OF THE INVENTION

The present invention relates to lithiated manganese oxides, to methods of making such materials and to the use of such materials in the manufacture of battery cathodes and electrodes for other purposes such as in electrochemical cells.

More particularly it relates to a process for the manufacture of $Li_2Mn_2O_4$ and the use of $Li_2Mn_2O_4$ in electrical storage batteries. Still more particularly, it relates to a process for the manufacture of $Li_2Mn_2O_4$ by the reaction of $LiMn_2O_4$ with lithium and to using $Li_2Mn_2O_4$ in the manufacturing of the cathode component of rechargeable lithium-ion electrical storage batteries.

Conventionally used nonaqueous electrolyte cells are primary cells which can be used only once. With recent widespread use of video cameras and small-sized audio instruments, there has been an increased need for secondary cells which can be used conveniently and economically for long, repeated use.

Lithium cells useful as electrical storage batteries incorporate a metallic lithium anode and a cathode including an active material which can take up lithium ions. An electrolyte incorporating lithium ions is disposed in contact with the anode and the cathode. During discharge of the cells, lithium ions leave the anode, enter the electrolyte and are taken up in the active material of the cathode, resulting in release of electrical energy. Provided that the reaction between the lithium ions and the cathode active material is reversible, the process can be reversed by applying electrical energy to the cell. If such a reversible cathode-active material is provided in a cell having the appropriate physical configuration and an appropriate electrolyte, the cell can be recharged and mused. Rechargeable cells are commonly referred to in the battery art as secondary cells. It has long been known that useful cells can be made with a lithium metal anode and a cathode-active material which is a sulfide or oxide of a transition metal, i.e., a metal capable of assuming plural different valence states. Dampier, "The Cathodic Behavior of CuS, $MoO_3$, and $MnO_2$ in Lithium Cells," J. Electrochem. Soc., Vol. 121, No. 5, pp. 656-660 (1974) teaches that a cell incorporating a lithium anode and manganese dioxide cathode-active material can be used as an electrical power source. The same reference further teaches that a lithium and manganese dioxide cell can serve as a secondary battery.

There has been considerable effort in the battery field directed towards development of cathode materials based on lithium manganese oxides. Both lithium and manganese dioxide are relatively inexpensive, readily obtainable materials, offering the promise of a useful, potent battery at low cost. Nonaqueous electrolyte primary cells using lithium as a negative electrode-active material and nonaqueous solvent such as an organic solvent as an electrolyte have advantages in that self-discharge is low, nominal potential is high and storability is excellent. Typical examples of such nonaqueous electrolyte cells include lithium manganese dioxide primary cells which are widely used as current sources for clocks and memory backup of electronic instruments because of the long-term reliability.

Secondary lithium batteries using an intercalation compound as cathode and free lithium metal as anode have been studied intensively due to their potential technological significance. Unfortunately, these studies have revealed that inherent dangers associated with the use of free lithium preclude the commercial viability of such batteries. Upon repeated cycling, dendritic growth of lithium occurs at the lithium electrode. Growth of lithium dendrites can lead eventually to an internal short-circuit in the cell with a subsequent hazardous uncontrolled release of the cell's stored energy.

One approach to improving the reversibility of lithium-based anodes involves the use of lithium intercalation compounds. The intercalation compound serves as a host structure for lithium ions which are either stored or released depending on the polarity of an externally applied potential. During discharge the electromotive force reverses the forced intercalation thereby producing current.

Batteries using this approach, in which an intercalation compound is used as the anode instead of free lithium metal, are known in the art as "lithium-ion" or "rocking-chair" batteries. Utilization of $Li_2Mn_2O_4$ in lithium-ion secondary batteries is described in detail in the recent review paper, "The $Li_{1+x}Mn_2O_4$/C Rocking-chair System," J. M. Tarascon and D. Guyomard, Electrochimica Acta, Vol. 38, No. 9, pp. 1221-1231 (1993).

In this approach, a nonaqueous secondary cell is provided with (a) a negative electrode consisting essentially of a carbonaceous material as a carrier for a negative electrode-active material, said carrier being capable of being doped and dedoped with lithium and (b) a positive electrode comprising lithium manganese complex oxide as an essential positive electrode-active material. This cell has a high expected applicability because dendrite precipitation of lithium does not occur on the surface of the negative electrode, the pulverization of lithium is inhibited, the discharge characteristics are good and the energy density is high.

The output voltage of this lithium-ion battery is defined by the difference in chemical potential of the two insertion compounds. Accordingly, the cathode and anode must comprise intercalation compounds that can intercalate lithium at high and low voltages, respectively.

The viability of this concept has been demonstrated and future commercialization of such cells in D, AA or coin-type batteries has been indicated. These cells include a $LiMn_2O_4$, a $LiCoO_2$ or a $LiNiO_2$ cathode, an electrolyte and a carbon anode. These lithium-ion batteries are described as being superior to nickel-cadmium cells and do not require a stringent environment for fabrication since the lithium based cathode employed is stable in an ambient atmosphere, and the anode is not free lithium metal, but an intercalation compound used in its discharged state (without intercalated lithium) that is stable in ambient atmosphere when the cells are assembled.

However, a nonaqueous electrolyte secondary cell such as described above has disadvantages in that the cell capacity has proven to decrease because some of the lithium doped into the carbonaceous material used as a negative electrode active material cannot be dedoped upon discharge. In practice, either carbon or graphite irreversibly consumes a portion of the lithium during the first charge-discharge cycle.

As a result the capacity of the electrochemical cell is decreased in proportion to the lithium that is irreversibly intercalated into the carbon during the first charge.

This disadvantage can be eliminated by using $Li_2Mn_2O_4$ as all or part of the cathode. Upon the first charge of the cell so manufactured, the $Li_2Mn_2O_4$ is converted to $\lambda$-$Mn_2O_4$. When the cell is operated over the appropriate range of electrical potential, subsequent discharge cycles of the cell convert $\lambda$-$Mn_2O_4$ to $LiMn_2O_4$, and charge cycles convert $LiMn_2O_4$ to $\lambda$-$Mn_2O_4$. Because excess lithium is available to satisfy the irreversible consumption by carbon or graphite, cells manufactured using $Li_2Mn_2O_4$ have greater electrical capacity.

The capacity of a lithium ion cell is also limited by the quantity of lithium which can be reversibly removed (i.e. cycled) from the cathode. In the cathode materials of the prior art, only about one half mole of lithium per transition metal can be removed reversibly. Thus, they have limited specific capacity, generally no more than about 140 mAh/g.

In principle, one mole of lithium per mole of manganese can be removed reversibly from $Li_2Mn_2O_4$. In practice, however, cells that cycle between $Li_2Mn_2O_4$ and $LiMn_2O_4$ suffer more rapid loss of electrical capacity than cells that cycle between $LiMn_2O_4$ and $\lambda$-$Mn_2O_4$. Moreover, cells that cycle between $LiMn_2O_4$ and $\lambda$-$Mn_2O_4$ deliver most of their electrical energy between about 4 volts and about 3 volts, whereas, cells that cycle between $Li_2Mn_2O_4$ and $LiMn_2O_4$ deliver most of their electrical energy between about 3 volts and about 2 volts.

Thus, a combination of factors gives a lithium-ion cell that cycles lithium between a carbon or graphite matrix as the anode and $LiMn_2O_4$ as the fully discharged cathode many particularly attractive features. Such cells can be assembled conveniently in an over-discharged state using carbon or graphite for the anode and $Li_2Mn_2O_4$ for the cathode. Because the second lithium ion cannot be used effectively for repeated cycling, its consumption to satisfy the irreversible lithium intercalation of the carbonaceous anode material does not entail any additional loss of electrical capacity.

The compounds $LiMn_2O_4$ and $Li_2Mn_2O_4$ that are useful in this application are known in the art. Depending upon methods of preparation, their stoichiometries can differ slightly from the ideal. They are precisely identified however by their x-ray powder diffraction patterns. The materials herein referred to as $LiMn_2O_4$ and $Li_2Mn_2O_4$ have the diffraction spectra given on cards 35-781 and 38-299, respectively, of the Powder Diffraction File published by the International Centre for Diffraction Data, Newtown Square Corporate Campus, 12 Campus Boulevard, Downtown Square, Pa., 19073-3273, USA.

$LiMn_2O_4$ can be prepared from a wide range of lithium sources and a wide range of manganese sources under a wide range of conditions. U.S. Pat. No. 5,135,732 discloses a method for the low temperature preparation of $LiMn_2O_4$. $LiMn_2O_4$ is one of the raw materials of the present invention.

In contrast, $Li_2Mn_2O_4$ is more difficult to prepare and in fact, known methods for the preparation of $Li_2Mn_2O_4$ are excessively costly. These methods include the electrochemical intercalation of lithium into $LiMn_2O_4$ (W. Li, W. R. McKinnon, and J. R. Dahn, *J. Electrochem. Soc.*, Vol. 141, No. 9, pp. 2310-2316), the reaction of $LiMn_2O_4$ with lithium iodide (U.S. Pat No. 5,266,299), and the reaction of $LiMn_2O_4$ with butyl lithium (M. M. Thackeray, W. I. F. David, P. G. Bruce, J. B. Goodenough, *Mat. Res. Bull.*, Vol 18, pp. 461-472 (1983)).

U.S. Pat. No. 5,196,279 teaches the synthesis of $Li_{1+x}Mn_2O_4$ from LiI and either $LiMn_2O_4$ or $\lambda$-$MnO_2$. The reaction is effected by heating mixtures of the solid reactants to 150° C. in sealed ampoules. $Li_{1+x}Mn_2O_4$ is a mixture of $Li_2Mn_2O_4$ and $LiMn_2O_4$.

U.S. Pat. No. 5,240,794 discloses a variety of lithium and lithium-ion batteries. These include a range of lithium manganese oxide compositions, including the composition $Li_{1+x}Mn_2O_4$. The patent discloses preparative methods for this composition generally involving mixing precursor lithium compounds and manganese compounds. The mixtures are then heated at elevated temperatures (typically 300° C.) in a reducing atmosphere (typically hydrogen gas) for several hours (typically 24 hours).

SUMMARY OF THE INVENTION

It is an object of the present invention to provide a nonaqueous electrolyte secondary cell having an increased cell capacity which comprises a negative electrode consisting essentially of a carrier for a negative electrode active material and a positive electrode comprising a lithium manganese oxide as an essential positive electrode active material.

In accordance with the present invention, the above object can be accomplished by $Li_2Mn_2O_4$ prepared by contacting $LiMn_2O_4$ with lithium suspended or dissolved in a solvent in which lithium generates solvated electrons or in which a catalyst is present that is capable of accepting an electron from lithium and delivering it to the $LiMn_2O_4$ reactant.

DESCRIPTION OF THE PREFERRED EMBODIMENT

As noted above, this invention is directed to a method of manufacturing $Li_2Mn_2O_4$. Specifically such method is accomplished by providing $LiMn_2O_4$, a source of lithium, dissolving lithium from the lithium source in a liquid medium in which lithium generates solvated electrons or the reduced form of an electron-transfer catalyst and contacting the $LiMn_2O_4$ with the lithium-containing liquid medium.

The source of lithium can be any source which makes elemental lithium available for reaction.

In accordance with the present invention lithium is dissolved by a solvent in which lithium generates solvated electrons or the reduced form of an electron-transfer catalyst and contacting the $LiMn_2O_4$ with the dissolved lithium. Advantageously the solvent is selected from the group consisting of ammonia, organic amines, ethers, pyridine, substituted pyridines, mixtures of ammonia and amines, and mixtures of ammonia and ethers. Preferably the solvent is ammonia, organic amines, or pyridines. When the solvent is ammonia the contacting step is advantageously carried out at a temperature of from about minus 30° C. to about minus 50° C. Preferably the temperature during the contacting step is maintained at from about minus 33° C. to about minus 45° C. When ammonia is the solvent it is preferred that it be in liquid form.

Optionally the liquid medium of the present invention can be a solvent having an electron transfer catalyst dissolved therein. The liquid medium may also be a mixture of compounds which is a liquid at the reaction temperature. Advantageously when such a liquid medium is employed, a catalyst selected from the group consisting of sulfur, sulfides, reducible sulfur compounds, iodine, iodides, reducible iodine compounds, pyridine, pyridine derivatives, and benzophenone is added to the liquid medium.

If the solvent used in the method of this invention is an organic amine, it is advantageously selected from the group consisting of methylamines, ethylamines, propylamines, and butylamines. Advantageously, the method of this invention is carried out wherein the organic amine is a liquid. Preferably the contacting step of the present method is carried out at a temperature of from about minus 25° C. to about 100° C. Preferably the contacting step is carried out from a temperature of from about 20° C. to about 90° C.

If the solvent used in the method of this invention is a pyridine or a substituted pyridine, the contacting step is advantageously carried out at a temperature from about minus 5° C. to about 190° C. Preferably when using pyridine or a substituted pyridine as the solvent the contacting step is carried out at a temperature of from about 30° C. to about 165° C.

As discussed above, the use for which the $Li_2Mn_2O_4$ prepared by the method of this invention is uniquely applicable is as a cathode for use in a secondary lithium ion electrochemical cell. Such a cell may be of known design having a lithium intercalation anode, a suitable nonaqueous electrolyte, a cathode of material made by the method of this invention, and a separator between the anode and the cathode. The anode may be of known materials such as transition metal oxides, transition metal sulfides and carbonaceous materials. The nonaqueous electrolyte can be in the form of a liquid, a gel or a solid matrix that contains mobile lithium ions.

The process of the present invention can optionally be practiced by providing an electron-transfer catalyst to the suspension of $LiMn_2O_4$ before or after the addition of lithium. Advantageously, the catalyst is selected from the group consisting of sulfur, sulfides, reducible sulfur compounds, iodine, iodides, reducible iodine compounds, pyridine, pyridine derivatives, and benzophenone.

Analysis of the products of this invention relies on X-ray diffraction. X-ray diffraction characterizes crystalline phases. It provides very reliable identifications of the compounds present in a sample, but it may not be a good quantitative-analysis method; poorly crystalline compounds or compounds which are present in small amounts (i.e., a few percent) may not be detected. Thus, undetected impurities, including $LiMn_2O_4$, could be present at low levels in the $Li_2Mn_2O_4$ so produced. However, it is also true that the chemical characteristics of $Li_2Mn_2O_4$ and the conditions of the X-ray diffraction measurement interact in a way which exaggerates the estimated amount of $LiMn_2O_4$ starting material left in the $Li_2Mn_2O_4$ product. If a $Li_2Mn_2O_4$ sample is exposed to laboratory air for several minutes in the course of making a diffraction measurement, $Li_2Mn_2O_4$ reacts with oxygen and water from the air to produce $LiMn_2O_4$ and LiOH as set forth in the following equation:

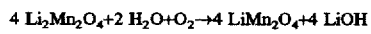

$$4\ Li_2Mn_2O_4 + 2\ H_2O + O_2 \rightarrow 4\ LiMn_2O_4 + 4\ LiOH$$

Successive X-ray spectra taken on the same sample show that the amount of $LiMn_2O_4$ present in the sample increases as the duration of its exposure to the atmosphere increases. Because the reaction requires that atoms diffuse between the surface of an individual particle and its interior, the reaction probably produces a growing shell of $LiMn_2O_4$ that surrounds a shrinking core of $Li_2Mn_2O_4$. Because the length of the diffusion path increases as the extent of reaction increases, the reaction is fast for pure $Li_2Mn_2O_4$ and much slower for partially converted $Li_2Mn_2O_4$ whose surface is already covered with $LiMn_2O_4$.

X-ray diffraction spectra of the $Li_2Mn_2O_4$ of this invention typically show some evidence for the presence of $LiMn_2O_4$. Computer reconstruction of the observed spectra from computer-stored spectra of the pure compounds gives somewhat subjective estimates of the relative heights of peaks attributable to each of the two compounds. These estimates are calculated from the estimated intensity of the principle peak of each compound. For well-protected products of seemingly clean reactions, this procedure typically gives $Li_2Mn2C)_4$purities in the range of 90–95%. These estimates appear to be conservative.

For materials synthesized toward the end of this experimental program, sample plaques were prepared inside an inert-atmosphere box. A hydrocarbon oil (3-in-1 Household Oil™) was mixed with the sample before the plaque was pressed. This procedure afforded excellent protection. When sample plaques are prepared in this way, $LiMn_2O_4$ peaks do not increase in intensity during the time required to collect replicate spectra.

Taken as a whole, the available information indicates that the reaction of lithium with $LiMn_2O_4$ goes stoichiometrically to completion, except insofar as side-reactions of lithium with the solvent limit the amount of lithium available to participate in the reduction of $LiMn_2O_4$.

EXAMPLE 1

Example 1 demonstrated that $Li_2Mn_2O_4$ was formed in the reaction of elemental lithium with $LiMn_2O_4$ in liquid ammonia.

A dry box was provided with tubing feed-throughs. Through a pair of feed-throughs, cold aqueous ethylene glycol was circulated into the dry box. The aqueous glycol was chilled externally by passage through a coil of copper tubing immersed in a dry ice-acetone bath. Inside the dry box, the chilled aqueous glycol passed through a coil of copper tubing immersed in ethanol; the ethanol was contained in a Dewar flask. The temperature of the ethanol was measured with a thermometer. Aqueous glycol was circulated at such a rate as to maintain the ethanol at about −45° C. A plastic bottle was suspended in the cold ethanol and served as a reaction vessel. A motor was arranged so that the contents of the plastic bottle could be stirred by a propeller on a shaft.

A liquid ammonia cylinder was chilled in a dry ice-acetone bath outside the dry box. A feed-through was used to transfer cold liquid ammonia from the cylinder into the plastic bottle in the dry box. About 75 ml of liquid ammonia were charged to the plastic bottle. To the liquid ammonia was added 9.0 g (50 millimoles) of $LiMn_2O_4$ and 0.35 g (50 millimoles) of finely divided lithium. The overhead stirrer was used to stir the mixture for about three hours. At the end of this period the initially black suspension had become brown. The suspended solids were collected using a pressure filter and analyzed by X-ray diffraction. As judged by the relative heights of the principal peaks, the recovered solids were about 80% $Li_2Mn_2O_4$ and 20% unreacted $LiMn_2O_4$.

EXAMPLE 2

Example 2 confirmed that $Li_2Mn_2O_4$ was formed in the reaction of elemental lithium with $LiMn_2O_4$ in liquid ammonia and indicated that a near-quantitative yield was possible.

The procedure of Example 1 was repeated. The brown solids produced were collected using a pressure filter and analyzed by X-ray diffraction. As judged by the relative heights of the principal peaks, the recovered solids were more than 90% $Li_2Mn_2O_4$ containing a small amount of unreacted $LiMn_2O_4$.

EXAMPLE 3

Example 3 demonstrated that quantitative conversion of $LiMn_2O_4$ to $Li_2Mn_2O_4$ in liquid ammonia required more than one hour at $-45°$ C.

The procedure of Example 1 was repeated, except that the reaction time was reduced to about 1 hour. The dark brown solids produced were collected using a pressure filter and analyzed by X-ray diffraction. As judged by the relative heights of the principal peaks, the recovered solids are about 50% $Li_2Mn_2O_4$ and about 50% unreacted $LiMn_2O_4$.

EXAMPLE 4

Example 4 demonstrated that $LiMn_2O_4$ was quantitatively converted to $Li_2Mn_2O_4$ by a two-fold excess of lithium in liquid ammonia in 2 hours at $-33°$ C.

The equipment of Example 1 was modified; the plastic-bottle reactor was replaced by a 100-ml three-neck round-bottom flask. The flask was fitted with a heating mantle and a reflux condenser. As in Example 1, aqueous ethylene glycol was chilled outside the dry box; the feed-throughs were used to circulate the chilled glycol through the shell side of the reflux condenser. In this modification, the reaction temperature was the normal boiling point of ammonia, maintained by refluxing the reactor contents. About 75 ml of liquid ammonia were charged to the round-bottom flask. To the liquid ammonia was added 5.67 g (31 millimoles) of $LiMn_2O_4$ and 0.44 g (63 millimoles) of finely divided lithium. The mixture was maintained at reflux for about 2 hours. At the end of this period the initially black suspension had become brown. The suspended solids were collected using a pressure filter and analyzed by X-ray diffraction. The spectrum was that of $Li_2Mn_2O_4$. No peaks attributable to unreacted $LiMn_2O_4$ were observed, indicating that $LiMn_2O_4$ was converted quantitatively to $Li_2Mn_2O_4$.

EXAMPLE 5

Example 5 demonstrated that $LiMn_2O_4$ was quantitatively converted to $Li_2Mn_2O_4$ by a two-fold excess of lithium in liquid ammonia in 1.5 hours at $-33°$ C.

The procedure of Example 4 was repeated, except that liquid ammonia containing 9.0 g (50 millimole) of $LiMn_2O_4$ was refluxed with 0.7 g (100 millimole) of finely divided lithium for about 1.5 hours. The brown solids produced were collected using a pressure filter and analyzed by X-ray diffraction. The spectrum was that of $Li_2Mn_2O_4$. No peaks attributable to unreacted $LiMn_2O_4$ were observed, indicating that $LiMn_2O_4$ was converted quantitatively to $Li_2Mn_2O_4$.

EXAMPLE 6

Example 6 demonstrated that $LiMn_2O_4$ was quantitatively converted to $Li_2Mn_2O_4$ by a two-fold excess of finely divided lithium in n-propylamine in 1.5 hours at about 25° C.

The procedure of Example 5 was repeated, except that the solvent was n-propyl amine at about 25 ° C. A suspension of 9.0 g (50 millimole) of $LiMn_2O_4$ and 0.7 g (100 millimole) of finely divided lithium was stirred for about 4 hours. The brown solids produced were collected using a pressure filter and analyzed by X-ray diffraction. The spectrum was that of $Li_2Mn_2O_4$. No peaks attributable to unreacted $LiMn_2O_4$ were observed, indicating that $LiMn_2O_4$ was converted quantitatively to $Li_2Mn_2O_4$.

EXAMPLE 7

Example 7 demonstrated that $LiMn_2O_4$ was quantitatively converted to $Li_2Mn_2O_4$ by a two-fold excess of large pieces of lithium foil in n-propylamine in about 50 hours at about 25° C.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (18.58 g, 103 millimoles) was charged to the flask and covered with 100 g of n-propyl amine. In a dry box, 1.48 g (213 millimoles) of lithium foil was cut into 1 $cm^2$ pieces and charged to a Schlenk tube. Using a T-shaped adapter in the third neck of the round-bottom flask and with a continuous flow of argon preventing contact between air and either the lithium or the $LiMn_2O_4$ suspension, the lithium pieces were transferred from the Schlenk tube to the round-bottom flask.

When lithium addition was complete, stirring was begun. Reaction was slow; after about 50 hours of stirring at ambient temperature, the suspension had become brown and no lithium was visible. After a total of 70 hours at these conditions, the brown product was recovered by filtration on a sintered-glass frit under an atmosphere of argon. It was analyzed by X-ray diffraction. The spectrum was that of $Li_2Mn_2O_4$. No peaks attributable to unreacted $LiMn_2O_4$ were observed, indicating that $LiMn_2O_4$ was converted quantitatively to $Li_2Mn_2O_4$.

EXAMPLE 8

Example 8 demonstrated that the conversion of $LiMn_2O_4$ to $Li_2Mn_2O_4$ by elemental lithium in n-propylamine at 25° C. was accelerated by addition of gaseous ammonia.

A 500 ml three-neck round-bottom flask was mounted on a ring stand in a hood. It was fitted with an overhead stirrer, a thermometer, a reflux condenser, provision for bubbling gaseous ammonia through the suspension, and provision for purging with argon. The assembled apparatus was vented to the atmosphere through a mineral-oil filled check valve. $LiMn_2O_4$ (18.52 g, 103 millimoles) was charged to the flask and covered with 250 ml of n-propyl amine. In a dry box, 1.48 g (213 millimoles) of lithium foil was cut into 1 $cm^2$ pieces, charged to a Schlenk tube, and transferred to the round-bottom flask by using a T-shaped adapter and a counterflow of argon to shield both the lithium and the $LiMn_2O_4$ suspension from contact with air.

When lithium addition was complete, stirring was begun. Then slow bubbling of a stream of gaseous ammonia through the suspension was begun. Interaction of absorbed ammonia with lithium was observed within a few minutes; bronze-color metallic-looking droplets formed on the surface of the suspension. After about 2 hours, the suspended solids became brown. Stirring and ammonia addition were discontinued; however, unreacted lithium remained visible both as the bronze-colored droplets and as grey-black lumps. Gas evolution was clearly evident at the surface of the unreacted lithium. Addition of a small additional quantity of $LiMn_2O_4$ led to rapid disappearance of most of the bronze-colored droplets. Resumption of stirring and ammonia addition was followed by reappearance of bronze-colored droplets. After an additional hour at these conditions, stirring and ammonia addition were again discontinued. The reaction mixture was allowed to stand for 48 hours; then the brown product was recovered by filtration on a glass frit under an atmosphere of argon. A few small lumps of what appeared to be unreacted lithium were observed. The brown product was analyzed by X-ray diffraction. The spectrum was that of $Li_2Mn_2O_4$. No peaks attributable to unreacted $LiMn_2O_4$ were observed, indicating that $LiMn_2O_4$ was converted quantitatively to $Li_2Mn_2O_4$.

EXAMPLE 9

Example 9 demonstrated that $LiMn_2O_4$ was readily converted to $Li_2Mn_2O_4$ by reaction with large pieces of elemental lithium in liquid ammonia and that formation of additional phases was possible.

A 500 ml three-neck round-bottom flask was mounted on a ring stand in a hood. Provision was made for purging with argon. The flask was fitted with an overhead stirrer and suspended over a dry ice-acetone bath which could be raised or lowered with a lab jack. The flask was vented to the atmosphere through a mineral-oil filled check valve. $LiMn_2O_4$ (18.5 g, 102 millimoles) was charged to the flask.

A 250 ml three-neck round-bottom flask was provided with a heating mantle. It was charged with about 200 ml of liquid ammonia from a storage tank. This flask was then connected to the reaction flask with a glass U-tube that had a standard taper joint at each end. The dry ice-acetone bath was raised under the reaction vessel; power was supplied to the heating mantle under the flask to which the ammonia was charged, and the ammonia was distilled into the reaction vessel.

In a dry box, 1.5 g (220 millimoles) of lithium foil was cut into 1 cm$^2$ pieces and charged to a Schlenk tube. With the liquid ammonia suspension maintained at −78° C., the lithium was transferred to the round-bottom flask by using a T-shaped adapter and a counterflow of argon to shield both the lithium and the $LiMn_2O_4$ suspension from contact with air. The dark blue color of lithium in ammonia was evident immediately. When lithium addition was complete, undissolved pieces of lithium were present. Stirring was begun. The reaction temperature was increased by decreasing the portion of the flask in contact with the dry ice-acetone mixture. At intervals, stirring was stopped so that the contents of the flask could be observed; gas evolution was evident at the surface of undissolved pieces of lithium. After about six hours, the blue color disappeared, indicating that all of the lithium had reacted. The reaction flask was then left in contact with ambient laboratory air, and the evaporating ammonia was vented into the hood through the check valve. The brown product was analyzed by X-ray diffraction. As judged by the relative heights of the principal peaks, the recovered solids were about 70% $Li_2Mn_2O_4$ and about 30% unreacted $LiMn_2O_4$. Small peaks attributable to a third phase were also present.

EXAMPLE 10

Example 10 demonstrated that the rate of conversion of $LiMn_2O_4$ to $Li_2Mn_2O_4$ by elemental lithium in tetrahydrofuran at 25° C. was very slow and that the rate was greatly increased by addition of gaseous ammonia.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (18.5 g, 102 millimoles) was charged to the flask and covered with 175 ml of tetrahydrofuran. In a dry box, 1.5 g (216 millimoles) of lithium foil was cut into 1 cm$^2$ pieces, charged to a Schlenk tube, and transferred to the round-bottom flask by using a T-shaped adapter and a counterflow of argon to shield both the lithium and the $LiMn_2O_4$ suspension from contact with air.

When lithium addition was complete, stirring was begun at laboratory-ambient temperature. No indication of reaction was observed in 50 hours. Thereafter, a slow stream of ammonia was passed though the reaction vessel. Within 30 minutes, bronze-color metallic-appearing liquid droplets formed. When the stirrer was turned off, these droplets floated to the surface of the suspension. Slow gas evolution at the surface of these droplets was evident. Within about seven hours of the introduction of gaseous ammonia, the suspended solids had become brown; however, unreacted lithium remained visible. The brown product was recovered by filtration on a sintered-glass frit under an atmosphere of argon. It was analyzed by X-ray diffraction. As judged by the relative heights of the principal peaks, the recovered solids were about 60% $Li_2Mn_2O_4$ and about 40% unreacted $LiMn_2O_4$.

EXAMPLE 11

Example 11 demonstrated that $LiMn_2O_4$ was quantitatively converted to $Li_2Mn_2O_4$ by a two-fold excess of lithium in an exothermic reaction in ethylenediamine.

A 500 ml three-neck round-bottom flask was mounted on a ring stand in a hood. It was fitted with an overhead stirrer, a thermometer, a reflux condenser, provision for bubbling gaseous ammonia through the suspension, and provision for purging with argon. The assembled apparatus was vented to the atmosphere through a mineral-oil filled check valve. $LiMn_2O_4$ (18.5 g, 102 millimoles) was charged to the flask and covered with 170 ml of ethylenediamine. In a dry box, 1.5 g (216 millimoles) of lithium foil was cut into 1 cm$^2$ pieces, charged to a Schlenk tube, and transferred to the round-bottom flask by using a T-shaped adapter and a counterflow of argon to shield both the lithium and the $LiMn_2O_4$ suspension from contact with air.

When lithium addition was complete, stirring was begun. Reaction and heat evolution began; within about 0.5 hour, the temperature reached 90° C. An ice bath was used to control the exotherm. When stirring was interrupted briefly, gas evolution was clearly evident at the surface of the unreacted lithium. When the exotherm was complete, no unreacted lithium was visible; the suspension was brown. The brown product was recovered by filtration on a sintered-glass frit and analyzed by X-ray diffraction. The spectrum was that of $Li_2Mn_2O_4$. No peaks attributable to unreacted $LiMn_2O_4$ were observed, indicating that $LiMn_2O_4$ was converted quantitatively to $Li_2Mn_2O_4$.

EXAMPLE 12

Example 12 demonstrated that the conversion of $LiMn_2O_4$ to $Li_2Mn_2O_4$ by elemental lithium in 1,2-dimethoxyethane at 25° C. was very slow and that the rate was greatly accelerated by addition of gaseous ammonia.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (18.5 g, 103 millimoles) was charged to the flask and covered with 175 ml of ethylene glycol dimethyl ether (1,2-dimethoxyethane). In a dry box, 1.5 g (216 millimoles) of lithium foil was cut into 1 cm$^2$ pieces, charged to a Schlenk tube, and transferred to the round-bottom flask by using a T-shaped adapter and a counterflow of argon to shield both the lithium and the $LiMn_2O_4$ suspension from contact with air.

When lithium addition was complete, stirring was begun at laboratory-ambient temperature. No indication of reaction was observed in 50 hours. Thereafter, a slow stream of ammonia was passed though the reaction vessel. Bronze-color metallic-appearing liquid droplets formed. After a further 24 hours, the reaction appeared to be complete; no unreacted lithium was observed, and the suspended solids were brown. The brown product was recovered by filtration on a sintered-glass frit, washed with two 100-ml portions of tetrahydrofuran, and dried in a vacuum under a sun lamp. It was analyzed by X-ray diffraction. As judged by the relative heights of the principal peaks, the recovered solids were about 75% $Li_2Mn_2O_4$ and about 25% unreacted $LiMn_2O_4$.

EXAMPLE 13

Example 13 demonstrated that the conversion of $LiMn_2O_4$ to $Li_2Mn_2O_4$ by elemental lithium in N,N,N',N'tetramethylethylenediamine was very slow.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (18.5 g, 103 millimoles) was charged to the flask and covered with 175 ml of N,N,N',N'-tetramethylethylenediamine. In a dry box, 1.5 g (216 millimoles) of lithium foil was cut into 1 $cm^2$ pieces, charged to a Schlenk tube, and transferred to the round-bottom flask by using a T-shaped adapter and a counterflow of argon to shield both the lithium and the $LiMn_2O_4$ suspension from contact with air.

When lithium addition was complete, stirring was begun at laboratory-ambient temperature. No indication of reaction was observed in about 16 hours. Thereafter, the temperature was increased to 90° C.; no indication of reaction was observed in about three hours. Thereafter, a slow stream of ammonia was passed though the reaction vessel; no indication of reaction was observed in about one hour. Upon cooling, bronze-color metallic-appearing liquid droplets formed on the surface of the suspension. The experiment was abandoned. No analysis was obtained on solids present.

EXAMPLE 14

Example 14 demonstrated that $LiMn_2O_4$ was quantitatively converted to $Li_2Mn_2O_4$ by a two-fold excess of lithium in an exothermic reaction in pyridine.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (18.5 g, 102 millimoles) was charged to the flask and covered with 175 ml pyridine. In a dry box, 1.5 g (216 millimoles) of lithium foil was cut into 1 $cm^2$ pieces, charged to a Schlenk tube, and transferred to the round-bottom flask by using a T-shaped adapter and a counterflow of argon to shield both the lithium and the $LiMn_2O_4$ suspension from contact with air. Lithium addition required about 0.5 hour; over this period, the suspension sustained an autothermal temperature increase to 35° C. When lithium addition was complete, vigorous stirring was begun. In a further 0.5 hour, a further autothermal increase brought the temperature to about 50° C., most of the lithium disappeared, and the suspended solids became brown. Stirring was continued for an additional two hours. The brown product was recovered by filtration on a sintered-glass frit under an atmosphere of argon. The filtrate was a clear red-brown solution. The recovered solids were washed under argon on the frit with two 100-ml portions of tetrahydrofuran. The tetrahydrofuran filtrates were purple; on contact with air, they bleached to a pale yellow. Volatiles were removed in vacuum to give 20.4 g of product which probably contained residual solvent. The product was analyzed by X-ray diffraction. The spectrum was that of $Li_2Mn_2O_4$. No peaks attributable to unreacted $LiMn_2O_4$ were observed, indicating that $LiMn_2O_4$ was converted quantitatively to $Li_2Mn_2O_4$.

EXAMPLE 15

Example 15 demonstrated that $LiMn_2O_4$ was converted to $Li_2Mn_2O_4$ by a stoichiometric amount of lithium in pyridine.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (38.44 g, 213 millimoles) was charged to the flask and covered with 200 ml pyridine. In a dry box, 1.48 g (213 millimoles) of lithium foil was cut into 1 $cm^2$ pieces, charged to a Schlenk tube, and transferred to the round-bottom flask by using a T-shaped adapter and a counterflow of argon to shield both the lithium and the $LiMn_2O_4$ suspension from contact with air. Lithium addition required about 5 minutes; over this period, no reaction was observed. Stirring was begun, and the suspension was heated using an electric mantle. The temperature rose to about 100° C. in about 20 minutes, and all of the lithium had reacted after about 40 minutes. Thereafter the suspension was refluxed for an additional hour. The suspended solids were brown.

After cooling to ambient temperature, the brown product was recovered by filtration on a sintered-glass frit in the air. The recovered solids were washed on the frit with three 40-ml portions of tetrahydrofurans, superficially dried on the frit, and transferred to a Schlenk tube. Residual solvent was removed by evacuation in an oil-pump vacuum with intermittent heating using a hot-air gun. The product was analyzed by X-ray diffraction. As judged by the relative heights of the principal peaks, the recovered solids were about 90% $Li_2Mn_2O_4$ and about 10% unreacted $LiMn_2O_4$. (Found: 7.2% Li, 45.9% $MnO_2$, 55.7% Mn, 0.40% C, 0.21% H, 270 ppm N. Theoretical for $Li_2Mn_2O_4$: 7.4% Li, 46.3% $MnO_2$, 58.5% Mn. Calculated from the lithium and Mn analyses, x in $Li_{1+x}Mn_2O_4$ is 1.04; from the $MnO_2$ and Mn analyses, x is 0.92.)

EXAMPLE 16

Example 16 demonstrated that a lesser solvent-to-$LiMn_2O_4$ ratio was satisfactory in the conversion of $LiMn_2O_4$ to $Li_2Mn_2O_4$ by a stoichiometric amount of lithium in pyridine.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (77.16 g, 427 millimoles) was charged to the flask and covered with 200 ml pyridine. In a dry box, 2.96 g (427 millimoles) of lithium foil was cut into 1 $cm^2$ pieces, charged to a Schlenk tube, and transferred to the round-bottom flask by using a T-shaped adapter and a counterflow of argon to shield both the lithium and the $LiMn_2O_4$ suspension from contact with air. Lithium addition required about 5 minutes and readjustment of the overhead stirrer required about 25 minutes; over this period, no reaction was observed. Stirring was begun, and the suspension was heated using an electric mantle. Thereafter, the temperature increased to the boiling point within about 5 minutes; to control the reflux rate, it was necessary to remove the heating mantle and cool the reaction flask with an ice bath. After about 10 minutes at reflux, no unreacted lithium was visible. Thereafter, the suspension was refluxed for an additional hour. The suspended solids were brown.

After cooling to ambient temperature, the brown product was recovered by filtration in an argon atmosphere. The recovered solids were washed on the frit with three 50-ml portions of tetrahydrofuran, superficially dried on the frit, and transferred to a Schlenk tube. Residual solvent was removed by evacuation in an oil-pump vacuum with intermittent heating using a hot-air gun. The product was analyzed by X-ray diffraction. As judged by the relative heights of the principal peaks, the recovered solids were about 90% $Li_2Mn_2O_4$ and about 10% unreacted $LiMn_2O_4$. (Found: 7.1% Li, 49.0% $MnO_2$, 55.8% Mn, 0.85% C, 0.22% H, 0.18% N. Theoretical for $Li_2Mn_2O_4$: 7.4% Li, 46.3% $MnO_2$, 58.5% Mn. Calculated from the lithium and Mn analyses, x in $Li_{1+x}Mn_2O_4$ is 1.02; from the $MnO_2$ and Mn analyses, x is 0.78.)

EXAMPLE 17

Example 17 demonstrated that a substoichiometric amount of lithium gave the expected proportions of $LiMn_2O_4$ and $Li_2Mn_2O_4$ upon reaction in pyridine.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (100.78 g, 557 millimoles) was charged to the flask and covered with 200 ml pyridine. In a dry box, 1.16 g (167 millimoles) of lithium foil was cut into 1 $cm^2$ pieces, charged to a Schlenk tube, and transferred to the round-bottom flask by using a T-shaped adapter and a counterflow of argon to shield both the lithium and the $LiMn_2O_4$ suspension from contact with air. Stirring was begun, and the suspension was heated using an electric mantle. The temperature increased to the boiling point within about 20 minutes. After about 5 minutes at reflux, the suspended solids were brown, and no unreacted lithium was visible. Thereafter, the suspension was refluxed for an additional 40 minutes.

The product was recovered by filtration in air, washed on the frit with three 50-ml portions of tetrahydrofuran, superficially dried on the frit, and transferred to a Schlenk tube. Residual solvent was removed by evacuation in an oil-pump vacuum with intermittent heating using a hot-air gun. The product was analyzed by X-ray diffraction. As judged by the relative heights of the principal peaks, the recovered solids were about 35% $Li_2Mn_2O_4$ and about 65% unreacted $LiMn_2O_4$. (Found: 4.8% Li, 64.5% $MnO_2$, 58.9% Mn, 0.14% C, 0.11% H, <100 ppm N. Theoretical for $Li_{1.3}Mn_2O_4$: 4.9% Li, 64.2% $MnO_2$, 60.1% Mn. Calculated from the lithium and Mn analyses, x in $Li_{1+x}Mn_2O_4$ is 0.28; from the $MnO_2$ and Mn analyses, x is 0.23.)

EXAMPLE 18

Example 18 demonstrated that a second substoichiometric amount of lithium gave the expected proportions of $LiMn_2O_4$ and $Li_2Mn_2O_4$ upon reaction in pyridine.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (100.83 g, 558 millimoles) was charged to the flask and covered with 200 ml pyridine. In a dry box, 2.321 g (334 millimoles) of lithium foil was cut into 1 $cm^2$ pieces, charged to a Schlenk tube, and transferred to the round-bottom flask by using a T-shaped adapter and a counterflow of argon to shield both the lithium and the $LiMn_2O_4$ suspension from contact with air. Stirring was begun, and the suspension was heated using an electric mantle. The temperature increased to the boiling point within about 6 minutes. After about 15 minutes at reflux, the suspended solids were brown, and only a small quantity of unreacted lithium was visible. Thereafter, the suspension was refluxed for an additional hour.

The product was recovered by filtration in air, washed on the frit with two 50-ml portions of tetrahydrofuran, superficially dried on the frit, and transferred to a Schlenk tube. Residual solvent was removed by evacuation in an oil-pump vacuum with intermittent heating using a hot-air gun. The product was analyzed by X-ray diffraction. As judged by the relative heights of the principal peaks, the recovered solids were about 65% $Li_2Mn_2O_4$ and about 35% unreacted $LiMn_2O_4$. (Found: 5.8% Li, 55.9% $MnO_2$, 57.9% Mn, 0.20% C, 0.09% H, <100 ppm N. Theoretical for $Li_{1.6}Mn_2O_4$: 6.0% Li, 56.4% $MnO_2$, 59.4% Mn. Calculated from the lithium and Mn analyses, x in $Li_{1+x}Mn_2O_4$ is 0.59; from the $MnO_2$ and Mn analyses, x is 0.56.)

EXAMPLE 19

Example 19 demonstrated the synthesis of $Li_2Mn_2O_4$ on a larger scale and demonstrated that a still lesser solvent-to-$LiMn_2O_4$ ratio was satisfactory in the conversion of $LiMn_2O_4$ to $Li_2Mn_2O_4$ by a stoichiometric excess of lithium in pyridine.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (100.11 g, 554 millimoles) was charged to the flask and covered with 200 ml pyridine. In a dry box, 5.763 g (831 millimoles) of lithium foil was cut into 1 $cm^2$ pieces and charged to an Erlenmeyer flask, which was then tightly stoppered. The lithium pieces were transferred quickly in air from the Erlenmeyer flask to the round-bottom flask. Stirring was begun, and heat evolved by reaction quickly increased the temperature to the boiling point. The contents of the flask became purple. Within about 30 minutes no unreacted lithium was visible. Thereafter, the suspension was refluxed for an additional hour.

The product was recovered by filtration in an argon atmosphere and washed on the frit with three 50-ml portions of tetrahydrofuran. The tetrahydrofuran filtrates were purple but quickly bleached to a pale yellow on contact with air. The product was superficially dried on the frit and transferred to a Schlenk tube. Residual solvent was removed by evacuation in an oil-pump vacuum with intermittent heating using a hot-air gun. The product was analyzed by X-ray diffraction. The spectrum was that of $Li_2Mn_2O_4$. No peaks attributable to unreacted $LiMn_2O_4$ were observed, indicating that $LiMn_2O_4$ was converted quantitatively to $Li_2Mn_2O_4$.

EXAMPLE 20

Example 20 demonstrated the conversion on a still larger scale of $LiMn_2O_4$ to $Li_2Mn_2O_4$ by a stoichiometric amount of lithium in pyridine.

A 2000 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (500.04 g, 2.77 moles) was charged to the flask and covered with 1000 ml pyridine. In a dry box, 19.30 g (2.78 moles) of lithium foil was cut into 1 cm² pieces and charged to an Erlenmeyer flask, which was then tightly stoppered. The lithium pieces were transferred quickly in air from the Erlenmeyer flask to the round-bottom flask. Stirring was begun, and heat evolved by reaction increased the temperature to the boiling point within about 30 minutes. The heat of reaction was sufficient to maintain the solvent at reflux for a further 30 minutes, at which time no unreacted lithium was visible. Thereafter, the suspension was refluxed for an additional hour.

The product was recovered in two portions by filtration in air on sintered-glass frits. Each cake was washed with about 100 ml of tetrahydrofuran. The filter cakes were superficially dried and transferred to a 1000-ml single-neck round-bottom flask. Residual solvent was removed by evacuation in an oil-pump vacuum; the flask was mounted on a rotary evaporator and rotated in an oil bath maintained at about 120° C. The product was analyzed by X-ray diffraction. The spectrum was essentially that of $Li_2Mn_2O_4$. Only very small peaks attributable to unreacted $LiMn_2O_4$ were observed, indicating that conversion to $Li_2Mn_2O_4$ was nearly quantitative. (Found: 7.1% Li, 46.7% $MnO_2$, 57.1% Mn, 0.43% C, 0.08% H, 350 ppm N. Theoretical for $Li_2Mn_2O_4$: 7.4% Li, 46.3% $MnO_2$, 58.5% Mn. Calculated from the lithium and Mn analyses, x in $Li_{1+x}Mn_2O_4$ is 0.96; from the $MnO_2$ and Mn analyses, x is 0.93.)

EXAMPLE 21

Example 21 demonstrated that elemental lithium reacted with pyridine in the absence of manganese oxides to give an intermediate species and that this intermediate species reacted with $LiMn_2O_4$ to give $Li_2Mn_2O_4$. By-product formation of dipyridyl compounds was demonstrated.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. Pyridine (200 ml) was charged to the flask. In a dry box, 3.84 g (398 millimoles) of lithium foil was cut into 1 cm² pieces and charged to an Erlenmeyer flask, which was then tightly stoppered. The lithium pieces were transferred quickly in air from the Erlenmeyer flask to the round-bottom flask. Stirring was begun. There was some temperature increase attributable to heat of reaction. A hot air gun and a heating mantle were used also to warm the mixture. After about 30 minutes, the temperature reached 50° C, and a yellow precipitate was visible. By the time the temperature reached 100° C. the solution had become blue-black. The mixture did not boil until the temperature reached about 121° C. It was refluxed for about 15 minutes, after which no lithium remained visible. Thereafter the mixture was cooled to about 50° C. When stirring was stopped, the mixture formed a viscous slush. $LiMn_2O_4$ (100.0 g, 553 millimoles) was charged to the flask rapidly. When stirring was resumed, a vigorous reaction began; heat evolution quickly increased the temperature of the mixture, which then boiled at 117° C. When heat evolution became insufficient to maintain reflux, a heating mantle was applied, and the mixture was refluxed for an additional 30 minutes. The blue-black color was gone, and the suspended solids were yellow-brown.

The suspended solids were recovered by filtration in air on a sintered-glass frit and washed on the frit with two 100-ml portions of tetrahydrofuran. The filter cake was superficially dried and transferred to a 1000-ml single-neck round-bottom flask. Residual solvent was removed by evacuation in an oil-pump vacuum; the flask was mounted on a rotary evaporator and rotated in an oil bath maintained at about 130° C. The product was analyzed by X-ray diffraction. The spectrum is that of $Li_2Mn_2O_4$.

The pyridine and tetrahydrofuran filtrates were combined. Removal of solvent on a rotary evaporator left about 38 g of a viscous, gummy, red-brown residue. Analysis of this residue by X-ray diffraction indicated that it contained dipyridyl. The infrared spectrum of the residue was consistent with the presence of aromatic heterocyclic compounds. Washing with water left a gummy red-brown solid. A portion of this solid was sublimed at about 140° C. to give pale yellow crystals which melted at 104°–110° C. (lit. for 4,4'-dipyridyl: 114° C.).

EXAMPLE 22

Example 22 demonstrated that the mass of $Li_2Mn_2O_4$ product recovered from the reaction of elemental lithium with $LiMn_2O_4$ in pyridine was 99.3% of theoretical. Co-production of 0.054 moles of dipyridyl compounds per mole of lithium charged was demonstrated. Minor amounts of other organic compounds were detected by gas-chromatographic analysis; in aggregate these non-dipyridyl compounds comprised less than 40% of the organic compounds present.

For this experiment, pyridine was distilled from 4 A molecular sieves, and $LiMn_2O_4$ was dried in a 120° C. oven for 48 hours. A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $LiMn_2O_4$ (100.42 g, 555 millimole) was charged to the flask. Distilled pyridine (200 ml, 196.4 g) was added. In a dry box, 3.84 g (553 millimoles) of lithium foil was cut into 1 cm² pieces and charged to an Erlenmeyer flask, which was then tightly stoppered. The lithium pieces were transferred quickly in air from the Erlenmeyer flask to the round-bottom flask. Stirring was begun, and the mixture was warmed with an electric mantle. After about 15 minutes at reflux, no lithium remained visible, and the suspended solids were yellow-brown; thereafter, the mixture was refluxed for an additional 30 minutes. It was then allowed to cool to ambient temperature.

A small sample of the supernatant solvent was withdrawn, filtered, and analyzed by gas chromatography. The suspended solids were recovered by vacuum filtration in air on a Buchner funnel through #42 Watman paper. The solids were washed with three 25-ml portions of pyridine. Pyridine filtrates from these washings were combined with the pyridine filtrate from the reaction. The combined pyridine filtrates weighed 382.5 g. During these filtrations, a liquid nitrogen trap between the filter flask and the vacuum pump recovered 13.78 g of colorless liquid from the vapor stream. Subsequent gas chromatographic analysis of this material found it to be substantially pure pyridine; three small peaks with retention times similar to that of pyridine accounted for only 0.14 area-percent of the chromatogram. The recovered solids were slurried in 100 ml tetrahydrofuran and refiltered. The filer cake was washed on the filter with several small portions of tetrahydrofuran. The tetrahydrofuran filtrates were combined and analyzed as described below.

Organic products were identified by GC/MS (gas-chromatography using a mass spectroscopic detector). Qualitative analyses were done with a longer column and a flame-ionization detector (FID). Response factors for the three dipyridyls were determined using authentic samples. They were very similar to one another; the area-percent measured for a the peak due to a given dipyridyl was very close to the weight-percent of that dipyridyl in pyridine solution.

Gas chromatographic analysis of the supernatant solvent gave 0.53 weight-percent (1.04 g) 2,2'-dipyridyl, 2.08 weight-percent (4.08 g) 4,4'-dipypridyl, and 1.27 weight-percent (2.49 g) 2,4'-dipyridyl. Other gas chromatograph peaks were present; in total these represented less than about 0.16 weight-percent (0.31 g) of the pyridine solution.

The combined pyridine filtrates were concentrated to 9.56 g of a viscous oil, a portion of which was dissolved in dichloromethane and analyzed by gas chromatography. Found: 1.026 g pyridine; 1.106 g 2,2'-dipyridyl; 4.421 g 4,4'-dipyridyl; and 2.695 g 2,4'-dipyridyl.

The combined tetrahydrofuran filtrates were concentrated to 2.07 g of a viscous oil, a portion of which was analyzed in the same way. It contained primarily tetrahydrofuran and pyridine. Found: 0.050 g 2,2'-dipyridyl; 0.104 g 4,4'-dipyridyl; and 0.072 g 2,4'-dipyridyl. Thus, the total yield of dipyridyls estimated by analyses of the solvent residues was 1.156 g 2,2'-dipyridyl, 4.525 g 4,4'-dipyridyl, and 2.767 g 2,4'-dipyridyl. These estimates, based on analyses of weighed residues, were about 10% greater than the estimates in the previous paragraph, based on analysis of the supernatant reaction solvent. It appeared likely that much of the difference was attributable to tetrahydrofuran extraction of dipyridyls chemisorbed on the $Li_2Mn_2O_4$ product.

The pyridine and tetrahydrofuran condensates from concentration of the filtrates were analyzed by gas chromatography. At most, only negligible quantities of reaction products were detected.

Following the last tetrahydrofuran rinse, the $Li_2Mn_2O_4$ filter cake was transferred to a round-bottom flask. The solids were heated with a sun lamp while the remaining solvent was removed on a rotary evaporator, in an oil-pump vacuum. The solids lost 16.61 g during drying; a liquid nitrogen trap captured 16.25 g of evolved solvent. Gas chromatographic analysis of the trapped solvent detected no reaction products. The dry product weighed 103.21 g. An additional 0.32 g of product was accounted for by weight gain of the dried filter paper. Since the total mass of inorganic reactants charged to the reactor was 104.26 g, these quantities accounted for 99.3% of the inorganics charged.

The product was analyzed by X-ray diffraction. As judged by the relative heights of the principal peaks, the recovered solids were about 90% $Li_2Mn_2O_4$ and about 10% unreacted $LiMn_2O_4$. (Found for duplicate analyses: 7.17%, 7.14% Li; 48.3%, 48.2% $MnO_2$; 57.1%, 57.2% Mn; 0.16%, 0.16% C; 0.22%, 0.22% H; 100 ppm, 100 ppm N. Theoretical for $Li_2Mn_2O_4$: 7.4% Li, 46.3% $MnO_2$, 58.5% Mn. Calculated from the lithium and Mn analyses, x in $Li_{1+x}Mn_2O_4$ is 0.98; from the $MnO_2$ and Mn analyses, x is 0.87.)

EXAMPLE 23

Example 23 tested pyridine as a catalyst for the synthesis of $Li_2Mn_2O_4$ from $LiMn_2O_4$ and elemental lithium at the higher temperature of refluxing 1,2-diethoxyethane.

In apparatus like that described for Example 21, 39.00 g (216 millimoles) $LiMn_2O_4$ was covered with 150 ml of 1,2-diethoxyethane. In a dry box, 1.50 g (216 millimoles) of lithium ribbon was cut into 1 $cm^2$ pieces and placed in a tightly stoppered Erlenmeyer flask. The lithium pieces were transferred quickly in air into the round-bottom flask. A 10 ml aliquot of pyridine was added. Except for brief periods, a counterflow of argon was maintained during these additions. Stirring was begun, and an electric heating mantle was used to increase the temperature to reflux (118° C.).

After 40 minutes at reflux, most of the lithium was consumed. Refluxing was continued for an additional three hours, at which time the suspension was red-brown. Stirring and heating were discontinued. The solid product was recovered as described for Example 21. It was analyzed by X-ray diffraction. As judged by the relative heights of the principal peaks, the recovered solids were about 85% $Li_2Mn_2O_4$ and about 15% unreacted $LiMn_2O_4$.

Gas chromatographic analysis of the filtrate showed that about 0.5 weight-percent consisted of organic products with retention times similar to those of dipyridyl isomers. Further identification of these organic products was not attempted. Concentration of the filtrate yielded 4.85 g of a dark red oil, which suggested that about half of the pyridine was converted to higher molecular weight by-products at the synthesis temperature. The oil contained 2.05 weight-percent lithium and 0.113 weight-percent manganese. This indicated that no significant portion of the manganese was solubilized by complexation with organic by-products.

EXAMPLE 24

Example 24 demonstrated preparation of a 1 kg batch of $Li_2Mn_2O_4$ by reaction of $LiMn_2O_4$ with elemental lithium in pyridine.

A 3000 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral oil filled check valve. $LiMn_2O_4$ (1,000 kg, 5.53 moles) was charged to the flask and covered with 1.5 liter of pyridine. The pyridine was purified previously by careful distillation. In a dry box, 38.38 g (5.53 moles) of 0.75 mm×19 mm lithium ribbon was cut into pieces about 20 mm long. These pieces were rolled into cylinders and placed in a tightly stoppered Erlenmeyer flask. The lithium pieces were transferred quickly in air into the round-bottom flask. Except for brief periods, a counterflow of argon was maintained during these additions.

When reagent additions were complete, stirring was begun. No external heating was applied. Over about 80 minutes, the exothermic reaction increased the temperature until the suspension began to reflux (115° C.). At this temperature the reaction was very rapid; to prevent flooding the reflux condenser, it was necessary to raise an ice bath under the round-bottom flask. About 20 minutes after reflux began, lithium consumption was essentially complete. Thereafter, an electric heating mantle was used to maintain the suspension at reflux for an additional 90 minutes.

The solid product was recovered on #1 Whatman filter paper in a Buchner funnel. The superficially dry filter cake was re-slurried in about 600 ml of tetrahydrofuran and the solids were again recovered by filtration. The cake was washed with two additional 300 ml portions of tetrahydrofuran. To the extent possible, a blanket of flowing argon was maintained over the solids during these operations. The wet filter cake was transferred to a glass pan and dried in an oven at about 150° C., first for about 20 hours in a stream of nitrogen and then for about 6 hours in a vacuum (about 28 tort). While still warm, the product was screened through a 35 mesh sieve. It was analyzed by X-ray diffraction. All of the peaks present were assigned to $Li_2Mn2O_4$, indicating that the product was substantially pure.

EXAMPLE 25

Example 25 demonstrated that 4-methylpyridine was an active catalyst for the reaction of lithium with $LiMn_2O_4$ to give $Li_2Mn_2O_4$.

In apparatus like that described for Example 21, 39.02 g (216 millimoles) $LiMn_2O_4$ was covered with 210 ml of 2-methoxyethyl ether (diglyme). In a dry box, 1.50 g (216 millimoles) of lithium ribbon was cut into 1 cm$^2$ pieces and placed in a tightly stoppered Erlenmeyer flask. The lithium pieces were transferred quickly in air into the round-bottom flask. Except for brief periods, a counterflow of argon was maintained during these additions. Stirring was begun, and an electric heating mantle was used to increase the temperature to reflux (162° C.). After 2 hours at reflux, there was no evidence of reaction. The suspension was then cooled to about 90° C., and 5 ml of 4-methylpyridine was injected. Thereafter, heating was resumed; refluxing was continued for an additional 7 hours, at which time the suspension was yellow-brown. Stirring and heating were discontinued.

The solid product was recovered by filtration in air on a medium-porosity sintered-glass frit. The filter cake was re-slurried in about 200 ml of tetrahydrofuran, refiltered, and dried on the frit. The superficially dry filter cake was transferred to a large glass Petri dish and dried in an oven at about 150° C., first for 12 hours in a stream of nitrogen and then for 4 hours in a vacuum. The tan product was analyzed by X-ray diffraction. As judged by the relative heights of the principal peaks, the recovered solids were about 60% $Li_2Mn_2O_4$ and about 40% unreacted $LiMn_2O_4$.

The filtrate was concentrated to 1.78 g of a viscous, dark-red oil. Gas chromatographic analyses of the filtrate and the residual oil indicated that small quantities of numerous organic materials were generated. These organic by-products were not investigated further. The residual oil contained 2.32 weight-percent lithium and 1.56 weight-percent manganese, indicating that no significant portion of the manganese was solubilized by complexation with organic by-products.

EXAMPLE 26

Example 26 explored the synthesis of $Li_2Mn_2O_4$ from lithium and $LiMn_2O_4$ in mixtures of pyridine and 1,2-dimethoxyethane (glyme).

In apparatus like that described for Example 21, 39.0 g (216 millimoles) $LiMn_2O_4$ was covered with 150 ml of 1,2-dimethoxyethane (glyme). In a dry box, 1.50 g (216 millimoles) of lithium ribbon was cut into 1 cm$^2$ pieces and placed in a tightly stoppered Erlenmeyer flask. The lithium pieces were transferred quickly in air into the round-bottom flask. Pyridine (50 ml) was added. Except for brief periods, a counterflow of argon was maintained during these additions. Stirring was begun, and an electric heating mantle was used to increase the temperature to reflux (about 91° C.). After about 90 minutes at reflux, the suspension was yellow-brown. Refluxing was continued for an additional 90 minutes; thereafter, stirring and heating were discontinued.

The solid product was recovered by filtration in air on a medium-porosity sintered-glass frit. The filter cake was re-slurried in about 200 ml of tetrahydrofuran, refiltered, and dried on the frit. The superficially dry filter cake was transferred to a large glass Petri dish and dried in an oven at about 150° C., first for about 16 hours in a stream of nitrogen and then for 4 hours in a vacuum. The tan product was analyzed by X-ray diffraction. As judged by the relative heights of the principal peaks, the recovered solids were about 94% $Li_2Mn_2O_4$ and about 6% unreacted $LiMn_2O_4$. (Found: 7.18% Li, 45.8% $MnO_2$, 56.7% Mn. Theoretical for $Li_2Mn_2O_4$: 7.4% Li, 46.3% MnO2, 58.5% Mn. Calculated from the lithium and Mn analyses, x in $Li_{1+x}Mn_2O_4$ was 1.10; from the $MnO_2$ and Mn analyses, x was 0.96.)

Concentration of the reaction-medium filtrate and the tetrahydrofuran-wash filtrate gave 2.48 g and 0.6 g of viscous residue, respectively. Gas chromatographic analyses of these residues found 0.26 g 2,2'-dipyridyl, 1.11 g 4,4'-dipyridyl, and 0.50 g 2,4'-dipyridyl; thus, a total of 1.87 g of dipyridyls was produced.

EXAMPLE 27

Example 27 further explored the synthesis of $Li_2Mn_2O_4$ from lithium and $LiMn_2O_4$ in mixtures of pyridine and 1,2-dimethoxyethane (glyme).

In apparatus like that described for Example 21, 200.0 g (1.11 moles) $LiMn_2O_4$ was covered with 190 ml of 1,2-dimethoxyethane (glyme). In a dry box, 7.752 g (1.12 moles) of lithium ribbon was cut into 1 cm$^2$ pieces and placed in a tightly stoppered Erlenmeyer flask. The lithium pieces were transferred quickly in air into the round-bottom flask. Pyridine (10 ml) was added. Except for brief periods, a counterflow of argon was maintained during these additions. Stirring was begun, and an electric heating mantle was used to increase the temperature to reflux (about 82° C.). After about 5 hours at reflux, no lithium was visible, and the suspension was yellow-brown. Stirring and heating were discontinued.

The solid product was recovered by filtration in air on a medium-porosity sintered-glass frit. The filter cake was re-slurried in about 400 ml of tetrahydrofuran, refiltered, and dried on the frit. The superficially dry filter cake was transferred to a large glass Petri dish and dried in an oven at about 125° C., first for about 16 hours in a stream of nitrogen and then for 6 hours in a vacuum. The tan product (207.1 g) was analyzed by X-ray diffraction. As judged by the relative heights of the principal peaks, the recovered solids were about 92% $Li_2Mn_2O_4$ and about 8% unreacted $LiMn_2O_4$. (Found: 6.98% Li, 46.1% $MnO_2$, 56.6% Mn. Theoretical for $Li_2Mn_2O_4$: 7.4% Li, 46.3% $MnO_2$, 58.5% Mn. Calculated from the lithium and Mn analyses, x in $Li_{1+x}Mn_2O_4$ was 0.95; from the $MnO_2$ and Mn analyses, x was 0.94.)

Concentration of the reaction-medium filtrate and the tetrahydrofuran-wash filtrate gave 2.61 g and 0.53 g of viscous residue, respectively. Gas chromatographic analyses of these residues found 0.22 g 2,2'-dipyridyl, 1.95 g 4,4'-dipyridyl, and 0.54 g 2,4'-dipyridyl; thus, a total of 2.71 g of dipyridyls was produced.

EXAMPLE 28

Example 28 further explored the synthesis of $Li_2Mn_2O_4$ from lithium and $Li_2Mn_2O_4$ in mixtures of pyridine and 1,2-dimethoxyethane (glyme).

In apparatus like that described for Example 21, 40.0 g (221 millimoles) $LiMn_2O_4$ was covered with 150 ml of 1,2-dimethoxyethane (glyme). In a dry box, 1.596 g (230 millimoles) of lithium ribbon was cut into 1 cm$^2$ pieces and placed in a tightly stoppered Erlenmeyer flask. The lithium pieces were transferred quickly in air into the round-bottom flask. Pyridine (50 ml) was added. Except for brief periods, a counterflow of argon was maintained during these additions. Stirring was begun, and an electric heating mantle was used to increase the temperature to reflux (about 89° C.). Within about 45 minutes at reflux, no lithium remained visible, and the suspension was dark brown. Refluxing was continued for an additional 2 hours; thereafter, stirring and heating were discontinued.

The solid product was recovered by filtration in air on a medium-porosity sintered-glass frit. The filter cake was re-slurried in about 200 ml of tetrahydrofuran, refiltered, and dried on the frit. The superficially dry filter cake was transferred to a large glass Petri dish and dried in an oven in a stream of nitrogen at about 150° C. for about 16 hours. The tan product (40.53 g) was analyzed by X-ray diffraction. As judged by the relative heights of the principal peaks, the recovered solids were about 93% $Li_2Mn_2O_4$ and about 7% unreacted $LiMn_2O_4$.

The reaction-medium filtrate and the tetrahydrofuran-wash filtrate were combined and concentrated to give 1.74 g of residue. Gas chromatographic analysis of this residue found 0.21 g 2,2'-dipyridyl, 0.92 g 4,4'-dipyridyl, and 0.43 g 2,4'-dipyridyl; thus, a total of 1.56 g of dipyridyls was produced. Analysis of the residue found 7 ppm lithium and 14 ppm Mn, indicating that no significant portion of the manganese was solubilized by complexation with organic by-products.

EXAMPLE 29

Example 29 further explored the synthesis of $Li_2Mn_2O_4$ from lithium and $LiMn_2O_4$ in mixtures of pyridine and 1,2-dimethoxyethane (glyme).

In apparatus like that described for Example 21, 120.0 g (664 millimoles) $LiMn_2O_4$ was covered with 170 ml of 1,2-dimethoxyethane (glyme). In a dry box, 4.720 g (680 millimoles) of lithium ribbon was cut into 1 cm² pieces and placed in a tightly stoppered Erlenmeyer flask. The lithium pieces were transferred quickly in air into the round-bottom flask. Pyridine (30 ml) was added. Except for brief periods, a counterflow of argon was maintained during these additions. Stirring was begun, and an electric heating mantle was used to increase the temperature to reflux (about 85° C.). After about 7 hours at reflux, no lithium remained visible, and the suspension was dark brown; thereafter, stirring and heating were discontinued.

The solid product was recovered by filtration in air on a medium-porosity sintered-glass frit. The filter cake was re-slurried in about 200 ml of tetrahydrofuran, refiltered, and dried on the frit. The superficially dry filter cake was transferred to a large glass Petri dish and dried in an oven at about 125° C., first for about 16 hours in a stream of nitrogen and then for 6 hours in a vacuum. The product was analyzed by X-ray diffraction. As judged by the relative heights of the principal peaks, the recovered solids were about 91% $Li_2Mn_2O_4$ and about 9% unreacted $LiMn_2O_4$.

The reaction-medium filtrate and the tetrahydrofuran-wash filtrate were combined and concentrated to give 2.97 g residue. Gas chromatographic analysis of the residue found 0.24 g 2,2'-dipyridyl, 1.28 g 4,4'-dipyridyl, and 0.50 g 2,4'-dipyridyl; thus, a total of 2.02 g of dipyridyls was produced. Analysis of the residue found <12 ppm lithium and 3.2 ppm Mn, indicating that no significant portion of the manganese was solubilized by complexation with organic by-products.

EXAMPLE 30

Example 30 tested benzophenone as a catalyst for the synthesis of $Li_2Mn_2O_4$ from $LiMn_2O_4$ and elemental lithium.

In apparatus like that described for Example 21, 39.02 g (216 millimoles) $LiMn_2O_4$ was covered with 200 ml of 2-methoxyethyl ether (diglyme). Benzophenone (5.10 g, 28 millimoles) was added. In a dry box, 1.48 g (213 millimoles) of lithium ribbon was cut into 1 cm² pieces and placed in a tightly stoppered Erlenmeyer flask. The lithium pieces were transferred quickly in air into the round-bottom flask. Except for brief periods, a counterflow of argon was maintained during these additions. Stirring was begun, and an electric heating mantle was used to increase the temperature. Within 30 minutes, the temperature reached 105° C., and color changes indicative of reaction were evident: the suspension was discernably brown; when stirring was interrupted, the liquid surface turned blue. After an additional 10 minutes, the temperature reached 128° C., and the entire reaction mixture became blue. After an additional 20 minutes during which the temperature rose to 140° C., the blue color faded, leaving a grey-brown suspension. The temperature was maintained at about 130° C. for an additional 30 minutes, at which time the suspension was yellow-brown. Heating was discontinued.

The solid product was recovered by filtration in air on a medium-porosity sintered-glass frit. Two 15-ml aliquots of tetrahydrofuran were used to wash solids from the round-bottom flask into the frit. The filter cake was washed on the frit with two 30-ml aliquots of tetrahydrofuran, and dried on the frit. The superficially dry filter cake was transferred to a Schlenk tube, and the remaining solvent was removed using an oil-pump vacuum and intermittent heating with a hot-air gun. The product was analyzed by X-ray diffraction. As judged by the relative heights of the principal peaks, the recovered solids were about 96% $Li_2Mn_2O_4$ and about 4% unreacted $LiMn_2O_4$. (Found: 7.03% Li, 47.1% $MnO_2$, 55.9% Mn. Theoretical for $Li_2Mn_2O_4$: 7.4% Li, 46.3% $MnO2$, 58.5% Mn. Calculated from the lithium and Mn analyses, x in $Li_{1+x}Mn_2O_4$ was 0.99; from the $MnO_2$ and Mn analyses, x was 0.87.)

The reaction-medium filtrate and the tetrahydrofuran-wash filtrate were combined and concentrated to give 5.15 g of dark-red oily residue. This residue was not characterized further.

EXAMPLE 31

Example 31 tested a much lesser concentration of benzophenone as a catalyst for the synthesis of $Li_2Mn_2O_4$ from $LiMn_2O_4$ and elemental lithium.

In apparatus like that described for Example 21, 201.00 g (1.11 moles) $LiMn_2O_4$ was covered with 200 ml of 2-methoxyethyl ether (diglyme). Benzophenone (0.52 g, 0.28 millimoles) was added. In a dry box, 7.753 g (1.12 moles) of lithium ribbon was cut into 1 cm² pieces and placed in a tightly stoppered Erlenmeyer flask. The lithium pieces were transferred quickly in air into the round-bottom flask. Except for brief periods, a counterflow of argon was maintained during these additions. Stirring was begun, and an electric heating mantle was used to increase the temperature to reflux (about 160° C.). After 24 hours at reflux, the suspension was yellow-brown, but unreacted lithium remained visible. Thereafter the suspension was cooled and allowed to stand under an argon blanket for about 15 hours. Over this period, the suspension settled to a solid mass. The experiment was abandoned.

EXAMPLE 32

Example 32 tested additional proportions of benzophenone catalyst in the synthesis of $Li_2Mn_2O_4$ from $LiMn_2O_4$ and elemental lithium.

In apparatus like that described for Example 21, 201.00 g (1.11 moles) $LiMn_2O_4$ was covered with 200 ml of 2-methoxyethyl ether (diglyme). Benzophenone (2.50 g, 14 millimoles) was added. In a dry box, 7.753 g (1.12 millimoles) of lithium ribbon was cut into 1 $cm^2$ pieces and placed in a tightly stoppered Erlenmeyer flask. The lithium pieces were transferred quickly in air into the round-bottom flask. Except for brief periods, a counterflow of argon was maintained during these additions. Stirring was begun, and an electric heating mantle was used to increase the temperature to reflux (162° C.). After 60 minutes at reflux, there was no visual evidence of reaction. The suspension was then cooled, and an additional 5.10 g (28 millimoles) of benzophenone was added. Heating was resumed, and the suspension was maintained at reflux for an additional 24 hours; at which time, it was yellow-brown, and no lithium remained visible.

The solid product was recovered by filtration in air. The solids plugged a medium-porosity sintered-glass frit, and product recovery was finally accomplished using a Buchner funnel with Whatman #1 paper. The filter cake was washed on the paper with four 50-ml aliquots of tetrahydrofuran, and dried on the frit. The superficially dry filter cake was transferred to a glass jar and dried in an oven at about 180° C. in a stream of nitrogen. The product was analyzed by X-ray diffraction. As judged by the relative heights of the principal peaks, the recovered solids were about 92% $Li_2Mn_2O_4$ and about 8% unreacted $LiMn_{2O4}$.

EXAMPLE 33

Example 33 evaluated the catalytic activity of pyridine in the synthesis of $Li_2Mn_2O_4$ from lithium and $LiMn_2O_4$ in refluxing 1,2-diethoxyethane.

In apparatus like that described for Example 21, 200.0 g (1.11 moles) $LiMn_2O_4$ was covered with 190 ml of 1,2-diethoxyethane. In a dry box, 7.752 g (1.12 moles) of lithium ribbon was cut into 1 $cm^2$ pieces and placed in a tightly stoppered Erlenmeyer flask. The lithium pieces were transferred quickly in air into the round-bottom flask. Pyridine (10 ml, 10.15 g) was added. Except for brief periods, a counterflow of argon was maintained during these additions. Stirring was begun, and an electric heating mantle was used to increase the temperature to reflux (about 122° C.). After about 60 minutes at reflux, the suspension was yellow-brown, but a substantial proportion of the lithium remained visible. The reaction rate appeared to have decreased greatly. Heating was interrupted, and an additional 10 ml of pyridine was added. Heating was resumed. After an additional 4 hours at reflux, no lithium remained visible. Heating and stirring were discontinued.

A small portion of the suspension was withdrawn and filtered. Gas chromatographic analysis of the filtrate found 4.56 g of pyridine, 0.36 g 2,2'-dipyridyl, 5.10 g 4,4'-dipyridyl, and 1.52 g 2,4'-dipyridyl. This analysis accounted for 60% of the pyridine charged and indicated that a total of 6.98 g of dipyridyls was produced. This indicated that the dipyridyls yield was excessive, and the low pyridine accountability suggested that this estimate of the yield may have been too low.

The solid product was recovered by filtration in air on a coarse sintered-glass frit. It was washed on the filter with four 50 ml portions of tetrahydrofuran, and dried superficially on the frit. The filter cake was transferred to a glass jar and dried in an oven in a stream of nitrogen at about 180° C. for about 18 hours. The product was analyzed by X-ray diffraction. As judged by the relative heights of the principal peaks, the recovered solids were about 95% $Li_2Mn_2O_4$ and about 5% unreacted $LiMn_2O_4$.

EXAMPLE 34

Example 34 demonstrated that elemental sulfur was an effective catalyst for the reduction of $LiMn_2O_4$ to $Li_2Mn_2O_4$ by lithium in a non-aqueous medium.

A 500-ml three-neck round-bottom flask, reflux condenser, and adapter joints were oven dried at 105° C. The round-bottom flask, overhead stirrer, reflux condenser, and argon inlet were assembled on a supporting bar in a hood. The assembled apparatus was purged with argon, which was vented to the atmosphere through a mineral oil filled check valve. $LiMn_2O_4$ (45.20 g, 250 mmole), Li (1.73 g, 250 mmole), S (0.80 g, 25 mmole), and 1,2-diethoxyethane (150 ml) were charged to the reactor. Stirring was begun. An electric heating mantle was used to warm the reaction mixture to reflux. Within about 3 hours, the suspended solids had become yellow-brown. Thereafter, the mixture was refluxed for an additional 4 hours.

The solid product was recovered by filtration in an oven-dried Schlenk filter tube under an atmosphere of argon. The color and odor of the filtrate suggested that the solvent was involved in side reactions. Many lumps of organic-coated lithium were separated mechanically from the product. The wet filter cake was dried in the Schlenk filter tube; the tube was evacuated with an oil pump and heated with several turns of electrical heating tape. A small amount of sulfur vaporized from the product. Thereafter, the filter tube was cooled, filled with argon, and taken into a dry box. The product was transferred to a glass jar. Subsequently, a small portion of the product was ground with 3-in-1™ oil and pressed into a plaque for XRD analysis. As judged by the relative heights of the principal peaks, the product contained about 25% $LiMn_2O_4$ and 75% $Li_2Mn_2O_4$. No other phases were evident.

EXAMPLE 35

Example 35 demonstrated that elemental iodine was an effective catalyst for the reduction of $LiMn_2O_4$ to $Li_2Mn_2O_4$ by lithium in a non-aqueous medium.

A 500-ml three-neck round-bottom flask was mounted on a supporting bar in a hood. It was fitted with an overhead stirrer, a reflux condenser, and an argon inlet. The assembled apparatus was purged with argon, which was vented to the atmosphere through a mineral oil filled check valve. $LiMn_2O_4$ (45.08 g, 250 mmole), Li (1.73 g, 250 mmole), LiI (1.0 g, 7.5 mmole), and 1,2-diethoxyethane (150 ml) were charged to the reactor. The mixture was stirred briefly and then allowed to settle. The supernatant solution was red-brown, consistent with the facile generation of 12. Thereafter, stirring was resumed, and an electric heating mantle was used to warm the reaction mixture to reflux. After about 20 hours at reflux, the suspension had become yellow-brown. Thereafter, the mixture was refluxed for an additional 6 hours.

The solid product was recovered by filtration in an oven-dried Schlenk filter tube under an atmosphere of argon. Many very small pieces of lithium were visible. The wet filter cake was dried in the Schlenk filter tube; the tube was evacuated with an oil pump and heated with several turns of electrical heating tape. Thereafter, the filter tube was cooled, filled with argon, and taken into a dry box. The product was transferred to a glass jar. Subsequently, a small portion of the product was ground with 3-in-1™ oil and pressed into a plaque for XRD analysis. The XRD spectrum of the product was cleanly that of $Li_2Mn_2O_4$.

What is claimed is:

1. A method for manufacturing $Li_2Mn_2O_4$ comprising the steps of:

(a) Providing $LiMn_2O_4$;

(b) Providing a source of elemental lithium;

(c) Providing a liquid medium in which elemental lithium generates solvated electrons or the reduced form of an electron-transfer catalyst;

(d) Dissolving the elemental lithium in the liquid medium;

(e) Contacting the $LiMn_2O_4$ with the liquid medium containing the dissolved elemental lithium and the solvated electrons or the reduced form of the electron-transfer catalyst;

(f) Reacting the $LiMn_2O_4$ with the dissolved elemental lithium to produce $Li_2Mn_2O_4$ product; and (g) Separating the $Li_2Mn_2O_4$ product formed in Step (f) from the liquid medium.

2. The method of claim 1 wherein the liquid medium is selected from the group consisting of ammonia, organic amines, ethers, pyridine, substituted pyridines, mixtures of ammonia and amines, and mixtures of ammonia and ethers.

3. The method of claim 2 wherein the liquid medium is ammonia.

4. The method of claim 3 wherein the temperature during the contacting step is maintained at from about minus 30° C. to about minus 50° C.

5. The method of claim 4 wherein the temperature during the contacting step is maintained at from about minus 33° C. to about minus 45° C.

6. The method of claim 2 wherein the liquid medium is an organic amine.

7. The method of claim 6 wherein the contacting step is carried out at a temperature of from about minus 25° C. to about 100° C.

8. The method of claim 7 wherein the contacting step is carried out at a temperature of from about 20° C. to about 90° C.

9. The method of claim 6 wherein the organic amine is selected from the group consisting of methylamines, ethylamines, propylamines and butylamines.

10. The method of claim 2 wherein the solvent is pyridine.

11. The method of claim 10 wherein the contacting step is carried out at a temperature of from about minus 5° C. to about 190° C.

12. The method of claim 11 wherein the contacting step is carried out at a temperature of from about 35° C. to about 125° C.

13. The method of claim 2 wherein the liquid medium is a substituted pyridine.

14. The method of claim 13 wherein the contacting step is carried out at a temperature of from about minus 5° C. to about 190° C.

15. The method of claim 14 wherein the contacting step is carried out at a temperature of from about 35° C. to about 165° C.

16. The method of claim 2 wherein the liquid medium is a mixture of ammonia and amines.

17. The method of claim 2 wherein the liquid medium is a mixture of ammonia and ethers.

18. The method of claim 2 wherein the solvent is an ether.

19. The method of claim 1 including the step of adding a catalyst to the $LiMn_2O_4$ prior to step (b).

20. The method of claim 1 including the step of adding a catalyst to the $LiMn_2O_4$ prior to step (c).

21. The method of claim 1 including the step of adding a catalyst to the $LiMn_2O_4$ immediately prior to step (d).

22. The method of claim 1 including the step of adding a catalyst to the $LiMn_2O_4$ immediately after step (d).

23. The method of claim 19 wherein the catalyst is selected from the group consisting of sulfur, sulfides, reducible sulfur compounds, iodine, iodides, reducible iodine compounds, pyridine, pyridine derivatives, and benzophenone.

24. The method of claim 20 wherein the catalyst is selected from the group consisting of sulfur, sulfides, reducible sulfur compounds, iodine, iodides, reducible iodine compounds, pyridine, pyridine derivatives, and benzophenone.

25. The method of claim 21 wherein the catalyst is selected from the group consisting of sulfur, sulfides, reducible sulfur compounds, iodine, iodides, reducible iodine compounds, pyridine, pyridine derivatives, and benzophenone.

26. The method of claim 22 wherein the catalyst is selected from the group consisting of sulfur, sulfides, reducible sulfur compounds, iodine, iodides, reducible iodine compounds, pyridine, pyridine derivatives, and benzophenone.

27. The method of claim 1 wherein the liquid medium is a solvent having an electron transfer catalyst dissolved therein.

28. The method of claim 27 wherein the liquid medium is a mixture of compounds which is a liquid at the reaction temperature.

29. The method of claim 27 wherein the catalyst is selected from the group consisting of sulfur, sulfides, reducible sulfur compounds, iodine, iodides, reducible iodine compounds, pyridine, pyridine derivatives, and benzophenone.

* * * * *

UNITED STATES PATENT AND TRADEMARK OFFICE
CERTIFICATE OF CORRECTION

PATENT NO. : 5,641,468
DATED : June 24, 1997
INVENTOR(S) : Paul C. Ellgen

It is certified that error appears in the above-indentified patent and that said Letters Patent is hereby corrected as shown below:

Column 1, line 45, delete "mused" and insert --reused--

Column 5, line 63, delete "$Li_2Mn_2O4$" and insert --$Li_2Mn_2O_4$--

Column 6, line 10, delete "$Li_2Mn2C)_4$" and insert --$Li_2Mn_2O_4$--

Column 19, line 3, delete "$Li_2Mn2O_4$" and insert --$Li_2Mn_2O_4$--

Column 20, line 8, delete "MnO2" and insert --$MnO_2$--

Column 20, line 60, delete "$Li_2Mn_2O_4$" and insert --$LiMn_2O_4$--

Column 22, line 35, delete "MnO2" and insert --$MnO_2$--

Column 23, line 28, delete "$LiMn_2O4$" and insert --$LiMn_2O_4$--

UNITED STATES PATENT AND TRADEMARK OFFICE
CERTIFICATE OF CORRECTION

PATENT NO. : 5,641,468
DATED : June 24, 1997
INVENTOR(S) : Paul C. Ellgen

It is certified that error appears in the above-indentified patent and that said Letters Patent is hereby corrected as shown below:

Column 24, line 51, delete "12" and insert --$I_2$--

Signed and Sealed this

Seventh Day of October, 1997

Attest:

BRUCE LEHMAN

Attesting Officer    Commissioner of Patents and Trademarks